United States Patent [19]
Vandermeulen et al.

[11] 3,847,455
[45] Nov. 12, 1974

[54] MOWER BLADE SADDLE ASSEMBLY

[75] Inventors: Douglas J. Vandermeulen, Martin; Siegfried K. Weis, Grand Rapids, both of Mich.

[73] Assignee: C. L. Frost & Son, Inc., Grand Rapids, Mich.

[22] Filed: Nov. 19, 1973

[21] Appl. No.: 416,864

[52] U.S. Cl. ............................ 308/187.1, 56/295
[51] Int. Cl. .................................... F16c 33/82
[58] Field of Search ........ 74/609, 240, 1, 2; 56/295; 308/36.4, 187.1

[56] References Cited
UNITED STATES PATENTS

| | | | |
|---|---|---|---|
| 2,669,826 | 2/1954 | Watrous | 56/295 X |
| 3,722,642 | 3/1973 | Zurek et al. | 192/8 R |
| 3,762,230 | 10/1973 | Steil et al. | 74/230.3 |

*Primary Examiner*—Samuel Scott
*Assistant Examiner*—F. D. Shoemaker
*Attorney, Agent, or Firm*—Price, Heneveld, Huizenga & Cooper

[57] ABSTRACT

In a rotary lawn mower the blade saddle or support is secured at a shoulder formed on the drive shaft by welding the saddle at its backside to the shaft. A spacer and a cover or shield positioned on the shaft between the saddle and bearing means supporting the shaft in a spindle housing shield the bearing and prevent the entrance of contaminating materials into the bearing.

15 Claims, 2 Drawing Figures

PATENTED NOV 12 1974

3,847,455

MOWER BLADE SADDLE ASSEMBLY

BACKGROUND OF THE INVENTION

In prior art rotary lawn mover drive assemblies the blade support or saddle and the blade are usually secured to the drive shaft by means of nuts or bolts threaded on or in the drive shaft. When the blade is removed for sharpening or replacement the various spacers, bearings, the saddle and like supporting components are also released and may be lost. In improved versions of the prior art, attempts have been made to secure the shaft and saddle by friction welding. The shaft and the saddle are threaded or otherwise provided with suitable openings to receive fastening means by which the blade is secured thereto. The shaft must be maintained in perfect perpendicular alignment with the blade otherwise severe vibration and wobbling of the blade will occur. From a manufacturing standpoint, it would appear that friction welding of the saddle and shaft would be a perfect solution. However, this has been found unsatisfactory since when pressure is applied, the shaft mushrooms, resulting in a welded construction that is oftentimes later subject to failure. If conventional welding techniques are used at the inner face of the shaft and saddle in the inside of the saddle, weld spatter occurs requiring extensive clean-up of the threaded portions of the shaft. Additionally, if weld spatter occurs on the inside face of the saddle, the blade will be tipped or canted when installed causing vibration problems. The effort therefore required to overcome the difficulties caused by welding the shaft and saddle together more than overcome the anitcipated advantages of such welded construction.

Additionally, in prior art constructions, the support bearing positioned within the spindle at the lower end tends to be extremely receptive to grass clippings, dirt and the like thereby resulting in premature failure of the bearing. Thus, there is a need in this art for an improved mower blade saddle assembly which provides both economical and service life advantages over the prior art.

SUMMARY OF THE INVENTION

The present invention overcomes the difficulties encountered in prior art structures in its provision of a novel saddle and shaft assembly supported by bearing means within the spindle housing. Spacer means is provided between the saddle and the lower bearing in the spindle housing and a shield or cover positioned for rotation with the shaft, spacer and blade support is spaced slightly from the lowermost end of the spindle to shield the bearing. The cover acts as a seal to prevent ingestion of contaminating materials as dirt and grass clippings into the bearing. The cover additionally serves as a cutter to cut grass clippings and the like preventing them from winding about the shaft and the spindle housing and by centrifugal force to throw these particles outwardly and away from the shaft, the spindle housing and the bearings.

In another aspect of the invention, the saddle is welded at the backside to the shaft providing increased strength. The spacer isolates the weld from the bearing and eliminates any difficulty from weld splatter such as contamination or eccentricity. A significant advantage of the invention is the provision of a spacing between the bearing and saddle for collection of clippings isolated from the bearing. Buildups will spin off by centrifugal force. The close tolerance between the cover and spindle prevent other than minute contaminants from entering the bearing and even these will spin off by centrifugal force. The utilization of a mig weld overcomes prior problems of balance since no pressures are artifically imposed on the shaft or saddle. Weldment on the backside eliminates splattering on the threads or inner face of the saddle and the preferred shield bears directly on the saddle not the weld. Other additional objects and advantages of the present invention will become apparent to those skilled in the art upon reading the following description with reference to the accompanying drawings illustrating a preferred and an alternate embodiment of the invention.

DESCRIPTION OF THE PREFERRED EMBODIMENT

Figure 1:
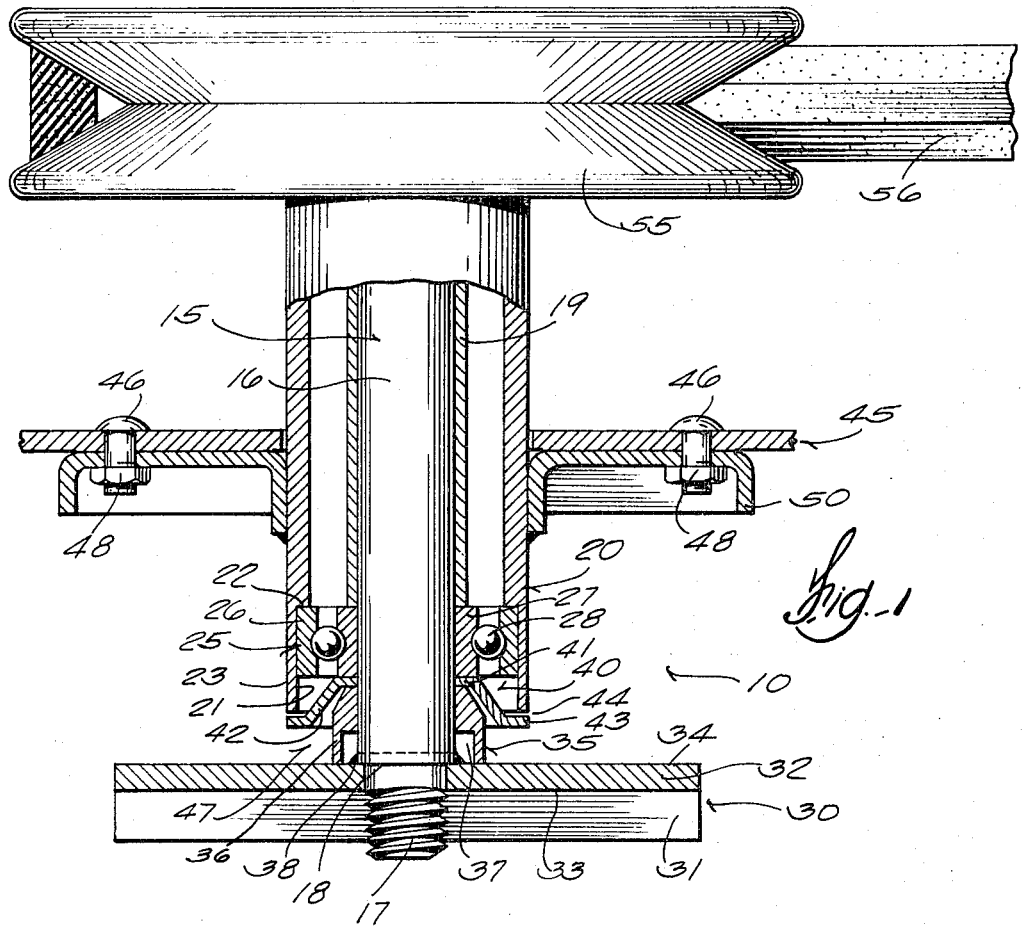
FIG. 1 is a cross-sectional view of the improved mower blade saddle assembly and support of the invention.

Referring to FIG. 1 the saddle assembly and shaft generally designated by the numeral 10 comprises a shaft 15 rotatably mounted in a spindle housing 20 by means of bearings 25. A blade holder or saddle 30 is secured at one end of the shaft by means of welding designated by the numeral 38. Positioned between bearing 25 and the saddle are a spacer 35 and a cover or shield 40 which forms an auxiliary cutter. The entire assembly is mounted within the framework 45 of a lawnmower (not shown) by means of an annular support bracket 50 welded to the outer diameter of spindle housing 20 and secured to framework 45 by means of conventional bolts 46 and nuts 48. A pulley wheel 55 is secured at the upper end of shaft 15 in a conventional manner and is connected through a drive belt 56 to a suitable source of power (not shown) as a gasoline engine.

Shaft 15 includes a large diameter elongated central portion 16 which extends downwardly to a smaller diameter threaded end portion 17. The intersection of the two diameters forms a shoulder 18. Saddle 30 is of conventional U-shaped construction having side walls 31 (only one is shown) and a bottom wall 32. Bottom wall 32 includes an inner surface 33 and an outer or backside surface 34. Backside 34 is fixed in abutting relationship with shoulder 18 by an annular gas metal-arc weld 38 known as a mig weld. Weld 38 forms a bond between the large diameter central portion 16 of shaft 15 and the backside 34 of bottom wall 32. One significant advantage of welding on the backside is the increased area (diameter) and hence strength of the weld. The mig weld however does not affect or cause eccentricity problems.

Spindle housing 20 includes an annular bore 21 at its lowermost end, the bore extending inwardly a slight distance and forming a shoulder 22. The outermost lower end of the spindle housing forms an annualr lip 23. Bearing 25 is positioned within the bore of the spindle housing such that its outer race 26 abuts shoulder 22. The bearing also includes an inner race 27 which receives the larger diameter central portion 16 of shaft 15. A plurality of anit-friction elements 28 space the outer race from the inner race. A spacer 19 surrounding shaft 15 abuts inner race 27 and extends through the spindle housing wwhere it abuts a corresponding bearing (not shown) positioned at the top of the spindle housing.

Spacer 35 is annular in configuration and includes a downwardly extending annular flange 36 forming a recess 37 in the lowermost portion thereof. Recess 37 encompasses the mig weld 38 while the lowermost ends thereof abut backside 34 of the bottom wall of saddle 30. A flat bearing is provided free of the weld or its normal splatter thereby insuring positive indexing upon assembly.

The cover or shiled 40 is also annular in configuration including a top wall 41 and an outwardly angularly downwardly extending side wall 42 terminating in an outwardly directed flange 43. Top wall 41 is held against inner race 27 of bearing 25 by spacer 35. Flange 43 extends outwardly to a diameter approximately equal to the outer diameter of spindle housing 20. When wall 41 abuts inner race 27 of bearing 25, the top surface of outwardly extending flange 43 is positioned with a slight clearance 44 between flange 43 and the spindle and lip 23. Preferably, clearance 44 is between 0.001 and 0.003 inches such that grass windings, clippings and the like of larger magnitude than the clearance are prevented from entering the bearing area. The joint rotation of the spacer and shield further urges expulsion of any such contaminates by centrifugal force. The spacing 47 between flange 43 and the backside 34 of saddle 30 provides a natural collection means for grass cuttings but completely isolates them from the bearing 25. Buildup of the clippings will spin off ultimately by centrifugal force.

Figure 2:
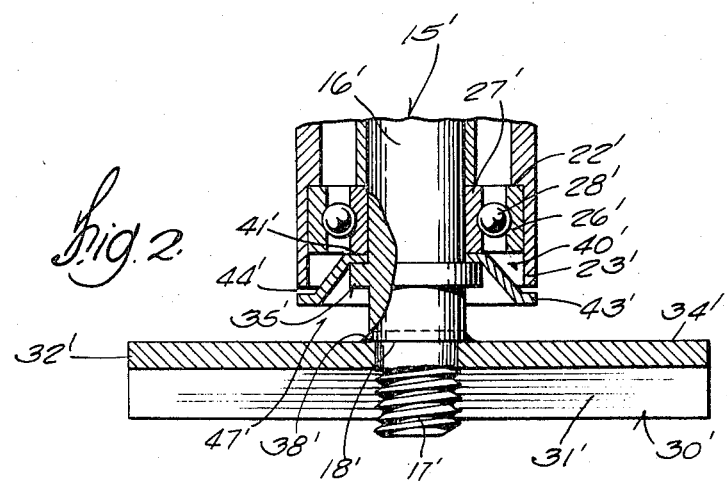
FIG. 2 is a fragmentary view in cross section illustrating an alternate embodiment of the invention.

An alternate embodiment of the spacer and cutter is shown in FIG. 2 wherein like numerals bearing the prime designation define like parts. In this embodiment spacer 35' is formed as an annular flange directly on the large diameter central portion 16' of shaft 15'. An upper wall of flange 35' buts the inner surface of top wall 41' of cover 40' and holds the cover in position with respect to the inner race 27' of the bearing. The outwardly extending flange 43' of cover 40' is positioned closely adjacent the lip 23' of spindle housing 20' to form the slight clearance 44' therebetween. Saddle 30' is secured at its backface 34 at shoulder 18' on shaft 16' by an annular mig weld 38.

The assembly is essentially the same in each embodiment. Saddle 30 is positioned over the reduced diameter portion 17 of shaft 15 and into abutment with shoulder 18. Weld 38 is preferably a 360° weld to secure the backface 34 of saddle 30 to the larger diameter portion 16 of shaft 15 at shoulder 18. In the embodiment of FIG. 1, the recess 37 in spacer 35 surrounds the weld. The top of the spacer holds cover or shield 40 in position so that its flange 43 is spaced slightly from lip 23 of thhe spindle housing. In the embodiment of FIG. 2, annular flange 35' formed on shaft 15' holds cover 40' in place and serves also to conrol the spacing of flange 43' from lip 23' and defines the ingestion spacing 47'.

The spacing between the lower lip 23 of the spindle housing 20 and the upper surface 34 of saddle 30 and the cutter 40 spaced therefrom by means of the spacer 35 permits grass windings to be collected beneath the cover 40 where they can do no harm since the cover shields the bearing 25. The controlled clearance 44 or 44' of approximately 0.001 to 0.003 inches between the lower lip 23 and the outwardly extending flange 43 of cap 40 insures that grass clippings will not be received in the bearing area. The grass would have to be shredded into an extremely fine clipping to get up into the bearing housing since the cover rotates with respect to the spindle housing at extremely high speeds. The cover when rotating acts as a cutter to destroy any grass clippings or windings entering the area of the spindle housing and cover. Accordingly grass clippings cannot be ingested into the bearing area. Centrifugal force alone will also spin off such fine clippings. An additional aspect of the invention is the mig welding of the saddle to the shaft at its backside. This provides increased strength since welding occurs at the large diameter portion of the shaft. Advantages are gained in avoiding problems of weld splattering onto the threaded end and onto the saddle inner face resulting in vibration and wobble since the blade will not seat properly in the saddle. The spacer between the saddle and the bearing encapsulating the weld area has an additional advantage since it eliminates grass windings about the shaft when used in connection with the bearing cover.

Those skilled in the art will recognize that other embodiments and modifications of this invention incorportaing the teachings hereof may readily be made in light of this disclosure. Accordingly, all modifications employing the principles of this invention are to be considered as included in the appended claims unless these claims by their language expressly state otherwise.

The embodiments of the invention in which an exclusive property or privilege is claimed are defined as follows:

1. In a shaft and blade support for a rotary lawnmower including a housing member having bearing means positioned adjacent at least one end thereof, a shaft extending through said housing and supported for rotation in said bearing means, and means on siad shaft adapted for connection to a driving means, the improvement comprising: said shaft having a first diameter portion supported in said bearing means and a second portion of reduced diameter at said one end, the intersection of said first and said second diameters forming an annualr shoulder; a blade support member positioned over said reduced diameter portion into abutment with said shoulder and welded to said shaft about said first diameter; and spacer means on said shaft positioned between said bearing means and said blade support.

2. The improvement of claim 1 and further including a shield member positoned between said spacer means and said bearing means, said shield member including a first surface in abutment with said bearing means, and an outwardly extending annular flange extending from said first surface, the outermost extremity of said flange being positioned closely adjacent the lower terminus of said housing to prevent the entrance of contaminating materials into said bearing means.

3. The improvement of claim 2 wherein said flange extend downwardly and outwardly from said first surface whereby a portion of said shield is disposed within said housing.

4. The improvement of claim 2 wherein said bearing means includes an inner race and an outer race separated by a plurality of anit-friction elements, said inner race engaging said shaft and said outer race being positioned in said housing and wherein said shield member engages said inner race and is rotatable therewith.

5. The improvement of claim 1 and further including said spacer means having an annular flange formed thereon, said flange engaging said blade holder and defining a recess in said spacer about said shaft, said recess providing a clearance for said weld about said first diameeter and said blade holder.

6. The improvement of claim 5 and further including a shield member positioned between said spacer means and said bearing means, said shield member including a first surface in abutment with said bearing means, and an outwardly extending annular flange extending from said first surface, the outermost extremity of said flange being positioned closely adjacent said housing to prevent the entrance of contaminating materials into said bearing means.

7. The improvement of claim 1 and further including said spacer means having a downwardly extending peripherial flange formed thereon, said flange embracing said weld and abutting said blade support to thereby maintain a perpendicular relationship between said support and said shaft.

8. The improvement of claim 7 wherein said spacer means positions said holder a predetermined distance from said housing, the spacing between said housing and holder defining collecting means for grass clippings and further including a shield member positioned between said spacer means and said bearing means, said shield member preventing the entrance of contaminants into said bearing means.

9. The improvement of claim 8 wherein said shield member includes a surface in abutment with said bearing means, and an outwardly extending annular flange extending from said surface, said flange being positioned closely adjacent said housing.

10. The improvement of claim 1 wherein said spacer means includes an annular flange formed on said shaft about said first diameter, and further including a shield member positioned between said spacer means and said bearing means, said shield member including a first surface in abutment with said bearing means, and an outwardly extending annular flange extending from said first surface, the outermost extremity of said flange being positioned closely adjacent said housing to prevent the entrance of contaminating materials into said bearing means.

11. The improvement of claim 10 wherein said flange extends downwardly and outwardly from said first surface whereby a portion of said shield is disposed within said housing.

12. The improvement of claim 10 wherein said bearing means includes an inner race and an outer race separated by a plurality of anit-friction elements, said inner race engaging said shaft and said outer race being positioned in said housing and wherein said shield member engages said inner race and is rotatable therewith.

13. In a shaft and blade support for a rotary lawnmower including a housing member having bearing means positioned adjacent at least one end thereof, a shaft extending through said housing and supported for rotation in said bearing means, and means on said shaft adapted for connection to a driving means, the improvement comprising: said shaft having an annular shoulder formed thereon; a blade support member positioned over said shaft with a back surface thereof abutting said shoulder and fusion welded thereto; spacer means on said shaft between said back surface and said bearing means for maintianing a predetermined spacing therebetween; and a shield member positioned between said spacer means and said bearing means, said shield member having a surface in abutment with said bearing means and an outwardly extending annular flange, said flange being positioned closely adjacent said housing and rotatable relative thereto with said shaft, the rotation thereof preventing the entrance of contaminants into said bearing means.

14. The improvement of claim 13 and further including said spacer means having a downwardly extending peripherial flange formed thereon, said flange embracing said weld and abutting said blade support to thereby maintain a perpendicular relationship between said support and said shaft.

15. The improvement of claim 13 wherein said spacer means includes an annular flange formed on said shaft about said first diameter.

* * * * *